Dec. 25, 1928.　　　　　　　　　　　　　　　　　　1,696,585
F. J. SHEPARD, JR., ET AL
PLATFORM FOR USE WITH ELEVATING TRUCKS
Filed Feb. 8, 1926

Inventors.
Frederick J. Shepard Jr.
Nathaniel Warshaw
by Heard Smith & Tennant
Attys.

Patented Dec. 25, 1928.

1,696,585

UNITED STATES PATENT OFFICE.

FREDERICK J. SHEPARD, JR., OF AUBURNDALE, AND NATHANIEL WARSHAW, OF BOSTON, MASSACHUSETTS, ASSIGNORS TO LEWIS-SHEPARD COMPANY, OF WATERTOWN, MASSACHUSETTS, A CORPORATION OF MASSACHUSETTS.

PLATFORM FOR USE WITH ELEVATING TRUCKS.

Application filed February 8, 1926. Serial No. 86,821.

This invention relates to improvements in platforms, particularly of the type which are used in connection with elevating trucks. Platforms of this character are usually from four to six feet in length and of a suitable width to permit an elevating truck to be backed beneath the platform. They are supported upon legs of sufficient length to provide a clearance from the floor sufficiently for the introduction of the elevating truck beneath the platform. The goods to be handled are piled upon the platform, the truck backed beneath the platform and its load supporting means elevated sufficiently to raise the legs of the platform from the floor, whereupon the truck may be drawn to its destination, the load supporting means lowered and the platform again deposited upon the floor.

Such platforms are used in transporting all kinds of material, particularly heavy material. They are subject to extremely rough usage. One of the objects of the present invention is to provide a platform which is capable of supporting a heavy load and which will withstand such rough usage.

A further object of the invention is to provide a platform in which the ends of the platform frame form a practically indestructible bumper which serves to protect the usual wooden top of the platform.

A further object of the invention is to provide a corner bracket and leg construction which will connect the end and side girders so rigidly together as to prevent any racking of the platform and which will give perfect stability thereto.

A further object of the invention is to provide a platform construction in which there will be no projections inside of the frame angles to obstruct the introduction of the truck beneath the platform.

A further object of the invention is to provide a leg construction of maximum strength and minimum weight.

Other objects and features of the invention will more fully appear from the following description and the accompanying drawing and will be particularly pointed out in the claims.

A preferred embodiment of the invention is illustrated in the accompanying drawing, in which, Fig. 1 is a perspective view of a preferred form of platform;

Figure 1:
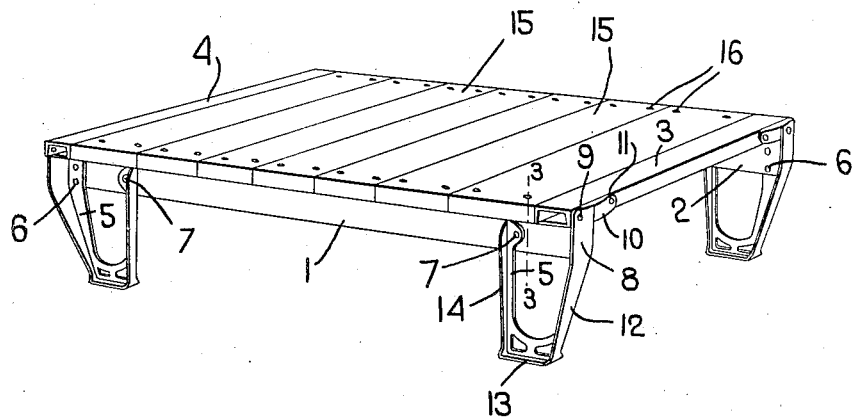
Figure 2:
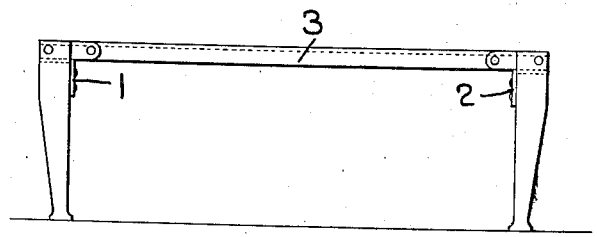
Fig. 2 is a side elevation of the same.
Figure 3:
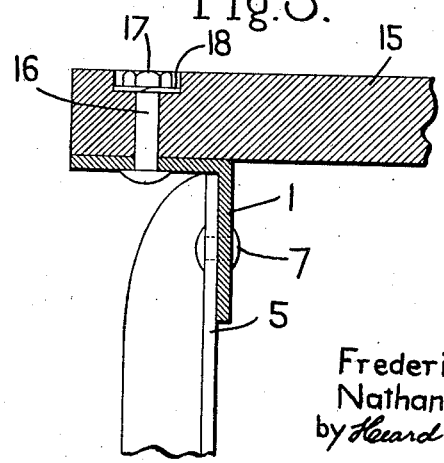
Fig. 3 is an enlarged detail sectional view on line 3—3 Fig. 1.

The platform illustrated in the accompanying drawing comprises a frame having preferably parallel side girders 1 and 2 formed of angle iron, connected by transverse end girders 3 and 4 which are superimposed upon the respective ends of the side girders and legs which are secured both to the ends of the side girders and the end girders and which serve also to connect the side and end girders rigidly together.

In the preferred construction illustrated the side girders are in the form of angle irons, the transverse members of which extend respectively outwardly toward, and preferably to, the edges of the platform and the vertical members thereof downwardly to present guides for the elevating truck. The end girders desirably are in the form of inverted channel bars, the flanges of which are superimposed upon the horizontal members of the side girders. The end girders desirably are of a thickness corresponding to the desired planking of the platform so that when the planks are secured at their ends to the horizontal members of the side girders by bolts, or other suitable fastening, the top of the platform will present throughout a plane surface.

The legs for the platform desirably are of integral construction formed of a high grade of forged malleable metal and preferably are of web skeleton form providing a maximum strength with a minimum of weight. Each leg comprises a web 5 which may be continuous, but preferably is skeletonized and which is secured at its upper end to the vertical member of the side girder by rivets or bolts 6 closely adjacent to the end of the side girder and by a rivet or rivets 7 at a considerable distance from the end of the side girder. The web desirably is provided with a marginal integral re-enforcing flange which is secured to the transverse end girder. In the preferred construction the upper outward portion 8 of the marginal flange overlies the end of the side girder and is secured to the outer face of the transverse girder by rivets 9. The flange is also provided with an extension 10 which projects inwardly, that is, toward the middle of the end girder from the body of the flange 8 and is secured to the outer face of the end girder by rivets 11. By reason of this construction a very rigid corner joint is provided to connect the side girders and end girders together and to the leg, thus insuring stability to the platform.

The outer flange of the leg desirably is provided with a downwardly and rearwardly tapering portion 12 to the foot of the leg. The horizontal portion 13 of the marginal flange provides a suitable broad foot for the leg, while the marginal portion 14 of the flange re-enforces the rearward portion of the leg, the term "rearwardly" being used herein as defining a direction rearwardly with respect to the adjacent end of the platform.

By reason of the downward and rearward inclination of the portion 12 of the flanges of the legs, guiding means is provided for aiding in directing the truck beneath the platform, particularly when a truck is being backed angularly beneath the platform. The engagement of the sides of its frame with the inclined flange will serve to shift the truck toward the center of the platform.

It will be noted that the webs of the legs are secured to the outer face of the vertical members of the angle bars so that there is no projection upon the inside of the frame to obstruct the introduction of the truck beneath the platform and the downwardly extending members of said angle bars form guides for the elevating truck when it is backed beneath the platform.

Any suitable flooring can be employed for the platform. Usually wooden planks 15 are employed which, as above stated, are of the same thickness as the depth of the inverted end girders 3. The boards 15 desirably are secured to the horizontal members of the side girders by bolts 16 and nuts 17 with spring washers 18 therebeneath, the planks being countersunk to receive the nuts and washers.

It will be understood that the embodiment of the invention disclosed herein is of an illustrative character and not restrictive and that various changes in form, construction and arrangement of parts may be made within the spirit and scope of the following claims.

Having thus described the invention, what is claimed as new, and desired to be secured by Letters Patent, is:

1. A platform comprising a floor, side girders of angle iron with the horizontal members thereof underlying said floor and extending respectively outwardly toward or to the edges of the floor and the vertical members thereof extending downwardly and presenting guides for a truck, transverse end girders of structural iron superimposed upon the ends of said side girders and metallic legs each of which is secured both to the outer side of the vertical member of a side girder and to the outer face of an adjoining end girder above the horizontal flange of the side girders.

2. A platform comprising a floor, side girders of angle iron with the horizontal members thereof extending respectively outwardly toward or to the edges of the floor and the vertical members thereof extending downwardly and presenting guides for a truck, transverse end girders of structural iron superimposed upon the ends of said side girders, acting to strengthen the structure and to protect the edges of the floor, integral metallic legs each having a web secured to the outer side of the vertical member of a side girder and a re-enforced flange overlying the end of the said side girder and secured to the outer face of the adjoining end girder above the horizontal flange of the side girders.

3. A platform comprising a frame having side girders of angle iron with the horizontal members thereof extending respectively outwardly toward or to the edges of the platform, inverted channel bars forming end girders superimposed upon the ends of said side girders, integral metallic legs each having a web secured to the outside of the vertical member of a side girder and a re-enforcing flange overlying the end of the said side girder having an extension projecting inwardly beyond the vertical member of the side bar and means respectively securing said flange and its extension to the outer face of said end girder.

4. A platform comprising a frame having side girders of angle iron with the horizontal members thereof extending respectively outwardly toward or to the edges of the platform, inverted channel bars forming end girders superimposed upon the ends of said side girders, metallic legs each having a web secured to the outside of the vertical member of a side girder and a marginal re-enforceing flange having an upper portion secured to said end girder and overlying the end of said side girder and provided with an inward extension secured to the outer face of the end girder beyond the vertical member of a side girder and a portion inclined downwardly and rearwardly with respect to the adjacent end of the platform.

5. A platform comprising a frame having side girders of angle iron with the horizontal members thereof extending respectively outwardly toward or to the edges of the platform, transverse end girders superimposed upon the ends of said side girders, integral U-shaped metallic legs each comprising a skeletonized web secured to the outside of the vertical member of a side girder adjacent the end thereof and at a distance therefrom and provided with a marginal re-enforcing flange having an upper portion overlying the end of said side girder and secured to the end girder and a downwardly tapering portion inclined rearwardly with respect to the adjacent end of the platform and a portion providing a foot for the leg.

In testimony whereof, we have signed our names to this specification.

FREDERICK J. SHEPARD, Jr.
NATHANIEL WARSHAW.